United States Patent [19]

Holz

[11] 4,017,401

[45] Apr. 12, 1977

[54] STRAINER DRUM AND METHOD OF MAKING THE SAME

[75] Inventor: Emil Holz, Eningen, Germany

[73] Assignee: Firma Hermann Finckh Metalltuch-und Maschinenfabrik, Baden-Wurttemberg, Germany

[22] Filed: Oct. 14, 1975

[21] Appl. No.: 622,438

Related U.S. Application Data

[63] Continuation of Ser. No. 428,897, Dec. 27, 1973, abandoned.

[30] Foreign Application Priority Data

Jan. 8, 1973   Germany ........................... 2300553

[52] U.S. Cl. ................................ 210/493; 210/402; 210/499; 55/400; 55/498; 55/521; 156/86; 156/210; 156/203
[51] Int. Cl.² ........................................ B01D 33/06
[58] Field of Search ........................... 210/402–404, 210/484, 486, 487–489, 493, 499; 55/400, 498, 521; 156/86, 210, 203

[56] References Cited

UNITED STATES PATENTS

| | | | |
|---|---|---|---|
| 555,020 | 2/1896 | Railton et al. | 210/486 |
| 1,656,455 | 1/1928 | Tinello | 210/499 |
| 3,519,137 | 7/1970 | Nilsson | 210/403 |
| R24,081 | 10/1955 | Webb et al. | 210/489 |

*Primary Examiner*—Bernard Nozick
*Attorney, Agent, or Firm*—Spencer & Kaye

[57] ABSTRACT

A strainer drum has a series of axially juxtapositioned, apertured carrier discs which define axially spaced, alternating, circumferentially extending crests and roots. The carrier discs support a prefolded one-piece filter fabric of the weft-and-warp type which is wrapped substantially 360° around the discs and which conforms to the crests and roots defined by the carrier discs. The wefts and warps of the filter fabric are oriented obliquely with respect to the drum axis.

6 Claims, 10 Drawing Figures

STRAINER DRUM AND METHOD OF MAKING THE SAME

CROSS-REFERENCE TO RELATED APPLICATION

This application is a continuation of application Ser. No. 428,897, filed Dec. 27, 1973 now abandoned.

The invention concerns a strainer drum having a supporting body — of carrier discs provided with perforations — for a filter fabric, wherein the crests of the carrier discs forming the circumference are arranged at an axial spacing from one another.

One builds strainer drum of that kind with filter fabrics following the contours of the carrier discs in order to increase the effective filter surface compound with a strainer drum with a cylindrical filter fabric envelope with equal outside dimensions. In the case of a known strainer drum of the initially mentioned kind (German laid open specification No. 1,461,511) a ring of filter fabric, which is approximately U-shaped in profile and the inner free edges of which forming a hole are clamped between carrier discs and spacer rings, which are seated between the carrier discs, is laid upon each carrier disc. The facing sides of the known strainer drum are finally formed by end discs.

In its manufacture, this known strainer drum is relatively expensive not only for the reason that apart from the carrier discs, spacing rings are still required, but also above all because the numerous filter fabric rings must be individually mounted and clamped firmly. In addition, the assembly of the known strainer drum does not permit optimal utilization of the drum surface, which is to be traced back to the spacing rings essentially required for the firm clamping of the rings of filter fabic.

The invention was based upon the task of creating a strainer drum, which with the same external dimensions possesses a greater effective filter area than the discussed known drum and which nevertheless can be manufactured with less expense.

Proceeding from a strainer drum of the initially mentioned kind, this problem is solved in accordance with the invention in, that an integral, prefolded filter fabric envelope, which has the shape of a bellows and in which warp and woft extend obliquely to the drum axis, is drawn over the supporting body, and that a clamping wire is arranged at least in the base of the folds of the bellows for locating the bellows relative to the suporting body.

Due to the fact, that warp and weft do not pass in axial and circumferential direction of the strainer drum, the filter fabric envelope is yielding in radial direction and can thus in simpler manner be brought into the form of a bellows. This is however the presupposition for the employment of an integral filter fabric envelope, which has as a consequence a better utilization of the strainer drum, i.e. a large effective filter area with the same external dimensions. To simplify the adaptation of the filter fabric to the shape of the supporting body of the strainer drum, it is advantageous, when the filter fabric envelope is pre-folded, i.e. that the filter fabric is folded in zig-zag before being laid on the supporting body.

The aforedescribed known strainer drum could give no suggestion in the direction of the solution according to the invention, since — although it considers the problem of the differential diameters — it tries to solve it with cumbersome and inadequate measures in that it is proposed to make the threads of the filter fabric passing in the longitudinal direction of the strainer drum extensible by crinkling or the like (see page 7, first paragraph of the German laid open specification No. 1,461,511). Warp and weft of the filter fabric thus pass in circumferential and axial direction in the known strainer drum.

It is of course known to mount an integral filter fabric envelope on supporting bodies for strainer drums, but only for the formation of a strictly circular cylindrical strainer drum, in which the aforementioned problems of the fold formation do not occur. Furthermore, circular cylindrical filter fabric envelopes are known, in which warp and weft pass obliquely to the cylinder axis — so-called diagonally cut filter fabrics — however, hitherto such diagonally cut filter fabrics have not been employed for strainer drums with a filter fabric envelope deviating from the strict cylinder shape, since one has apparently not recognized, that the prblem of the fold formation can be simply solved with such diagonally cut filter fabrics.

The strainer drum according to the invention can be manufactured particularly simply, when the filter fabric is a shrunk-on fabric of synthetic material, since the later lays itself particularly snugly against the carrier discs of the supporting body.

It is advantageous, when the carrier discs are each composed of two disc bodies, which are joined together along the central plane of the carrier discs and which can be cheap pressed parts of synthetic material.

Expediently, in the manufacture of the strainer drum according to the invention, a diagonally cut filter fabric is prefolded corresponding to the arrangement of the carrier discs and there laid upon the supporting body, whereupon the mutually overlapping longitudinal edges of the filter fabric are connected, in particular cemented, one to the other. In case of a filter fabric of synthetic material, the latter is shrunk by heating after the connection of the longitudinal edges and the clamping of the free ends.

The strainer drum according to the invention can thus to be manufactured with the same effort as a conventional flush strainer drum; however it displays a filter area approximately four to eight times greater than a flush strainer drum. Even compared with the known strainer drum of the initially mentioned kind, the strainer drum according to the invention display a greater effective filter area and moreover it may be manufactured still more inexpensively.

Further features and details of the invention are evident from the attached claims and/or from the following description and the attached drawing, which shows a preferred embodiment of the strainer drum according to the invention and the explanation of which is served by the following description taken in conjunction with the drawings, wherein.

Figure 1:
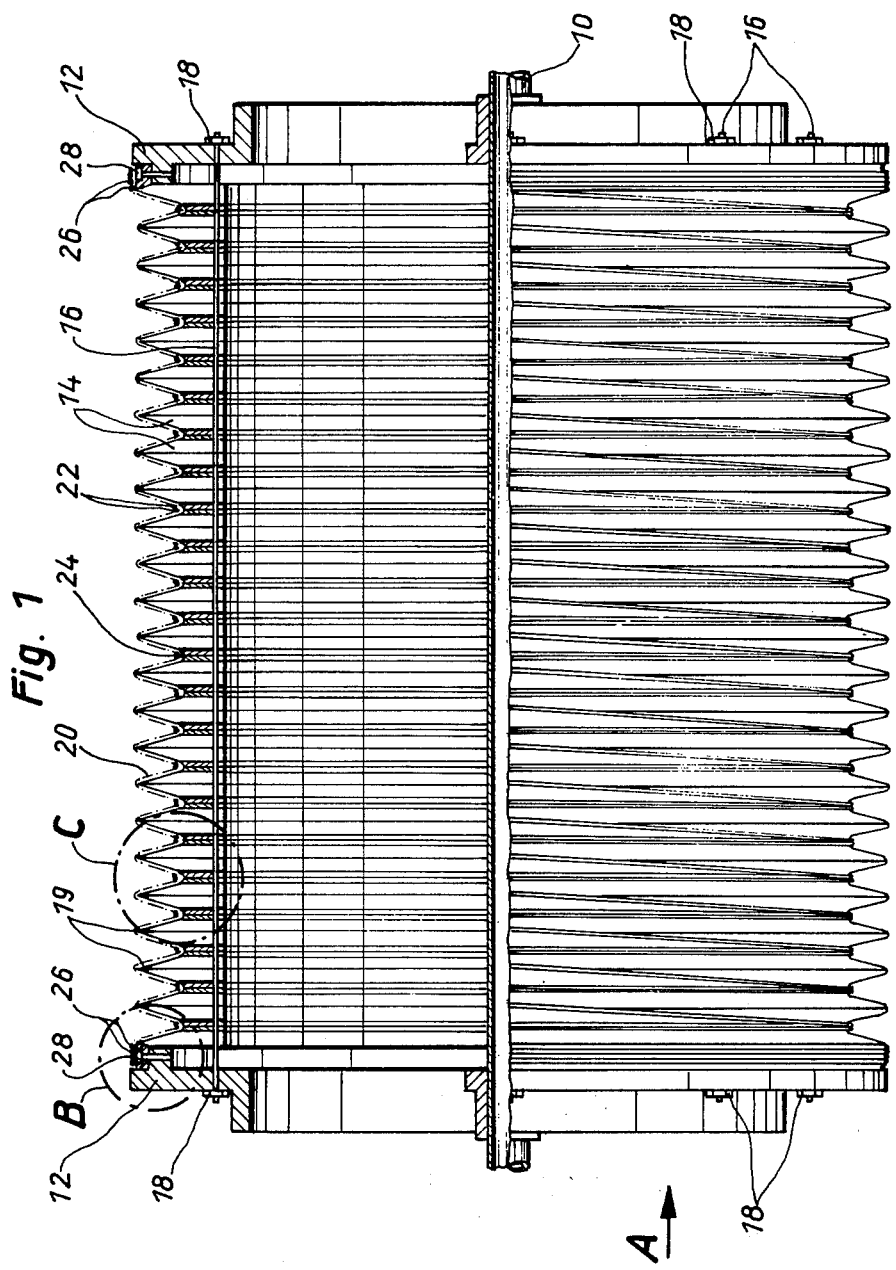
FIG. 1 is a strainer drum, partially in side elevation and partially in lonitudinal section.
Figure 4:
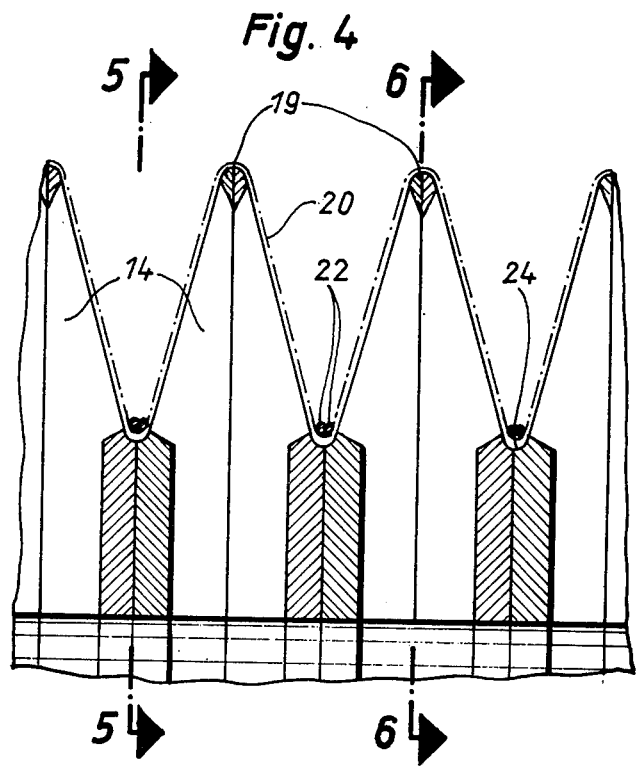
FIG. 4 is the detail C of FIG. 1 to an enlarged scale.
Figure 5:
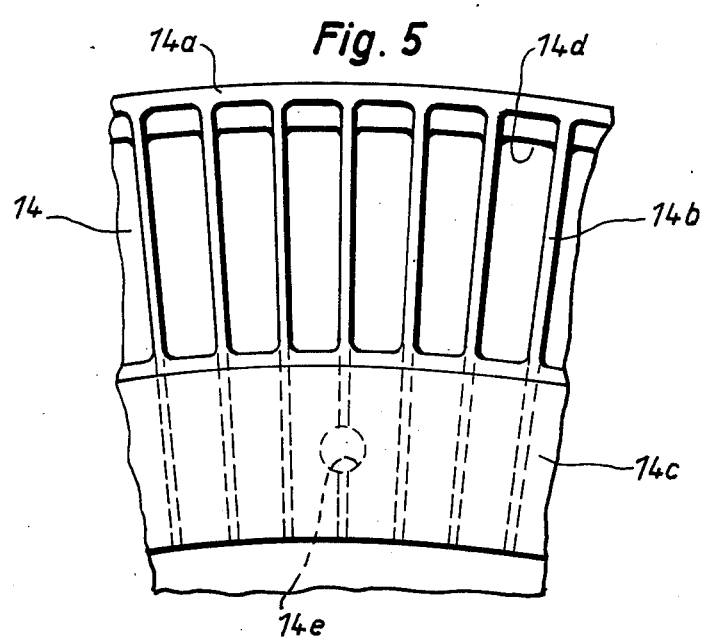
FIG. 5 is a part of a section through the carrier discs of the strainer drum along the line 5—5 in FIG. 4.
Figure 6:
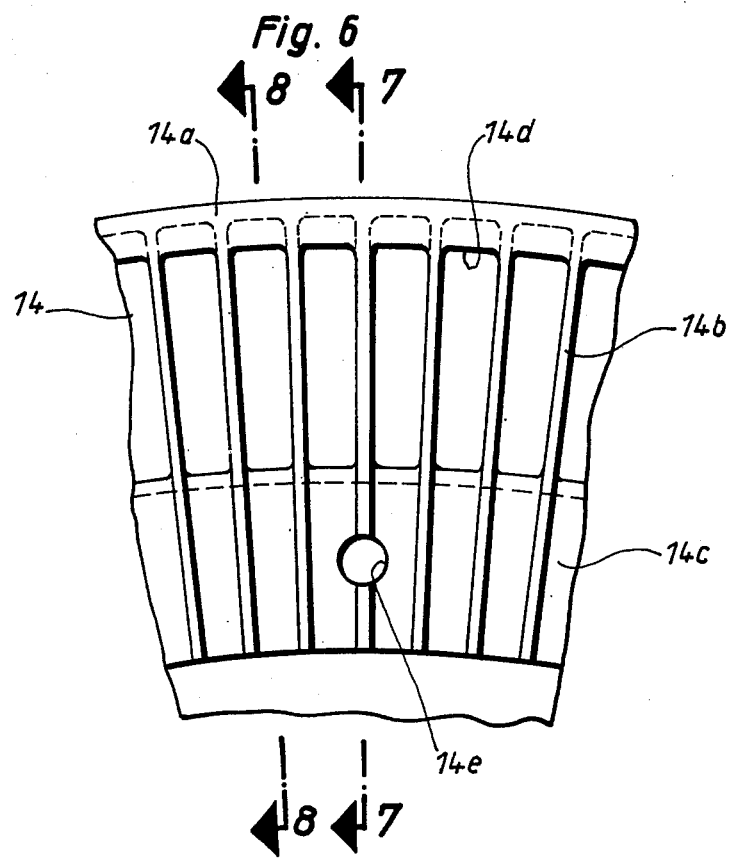
FIG. 6 is a detail of a further section through the carier discs along the line 6—6 in FIG. 4.
Figure 7:
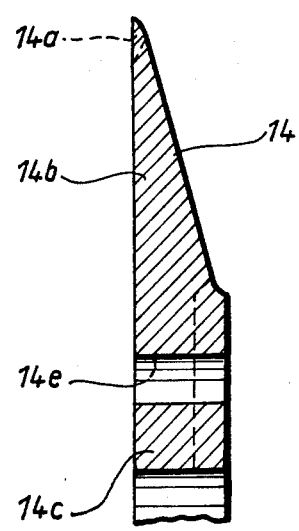
Figure 8:
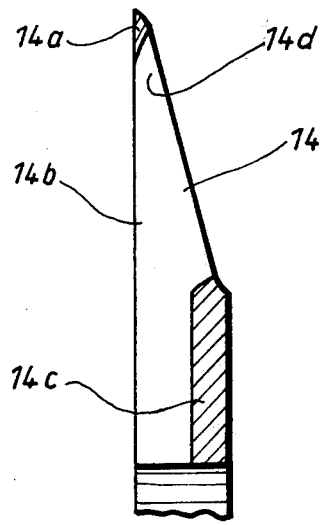
Figure 10:
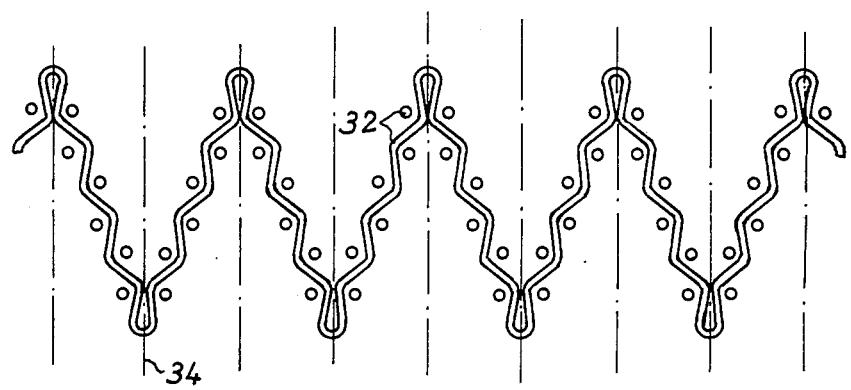
Figure 9:
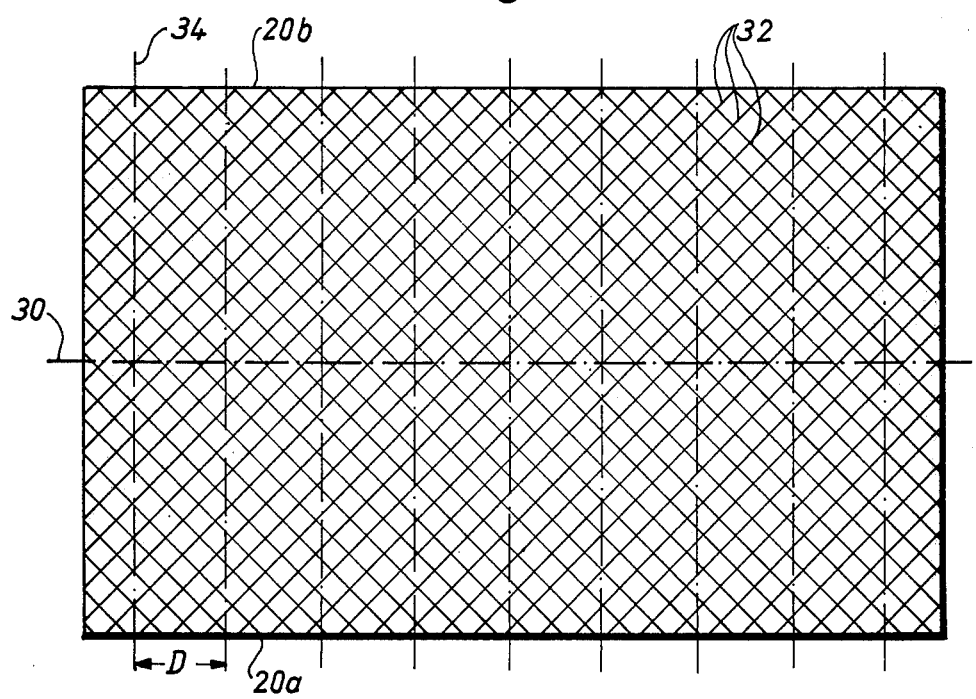

FIGS. 7 and 8 are sections along the lines 7—7 and 8—8 in FIG. 6;

FIG. 9 is a plan view of the web of filter fabric for the formation of the filter fabric envelope for the strainer drum, and FIG. 10 is the detail C of FIG. 1 to a still greater scale then in FIG. 4 but not true to scale and without representation of the carrier discs.

As can be recognized from FIS. 1 and 2, two end discs 12, which form the facing walls — provided with passages — of a strainer drum, sit on a shaft 10. A multiplicity of carrier discs 14, the structure of which will be described later, is arranged between the end discs. They have the shape of rings with a triangular profile at the circumference and they are arranged alternately in mirror image to one another. Tie bolts 16, the ends of which display thread sections not illustrated in detail, are passed through bores in the end and carrier discs, so that the strainer drum can be drawn together by nuts 18. The end discs end the entirety of the carrier discs from a supporting body with a meander-shaped profile at the circumference, over the create 19 of which a prefolded filter fabric envelope 20 is laid. In the illustrated embodiment, the latter is drawn into the base of the grooves 24 formed by the supporting body by means of a clamping wire belix 22; in the case of a filter fabric of threads of synthetic material, a conformation of the filter fabric envelope to the circumference of the supporting body can however also be attained by a shrinking process, for which the filter fabric is heated. The ends of the filter fabric envelope 20 are located on the end discs 12 with the aid of clamping rings 26, screws 28 serving the tightening of the clamping rings. The ends of the clamping wire 22 are fixed on the circumference of the clamping rings in a manner not illustrated in detail.

Figure 2:
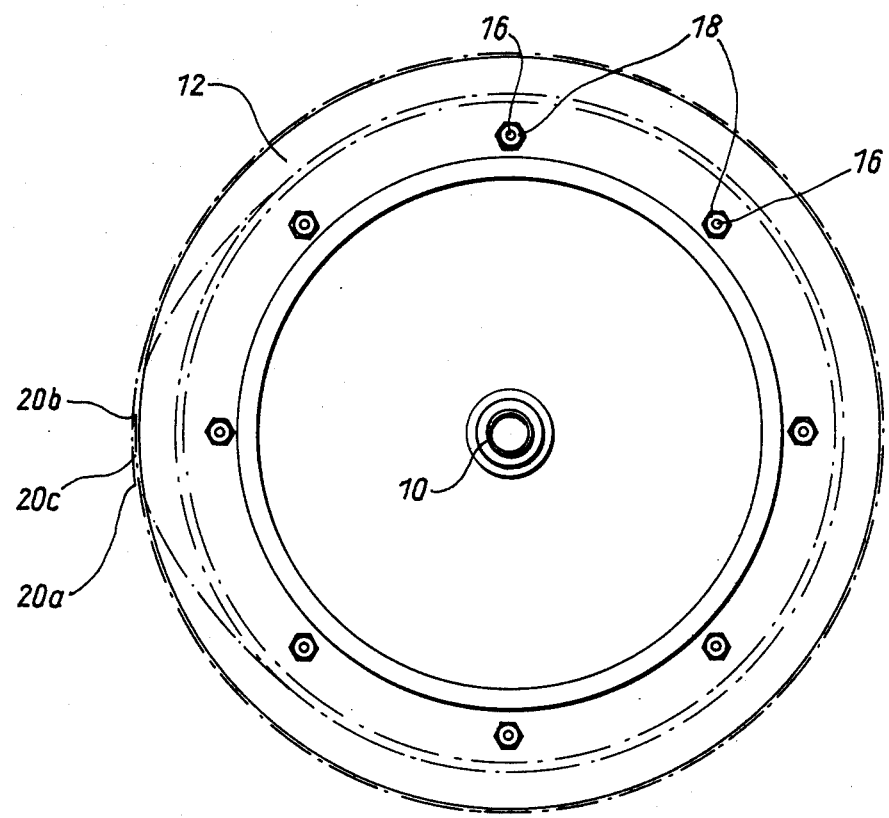
FIG. 2 is an end elevation of the strainer drum as viewed in the direction of arrow A in FIG. 1.
Figure 3:
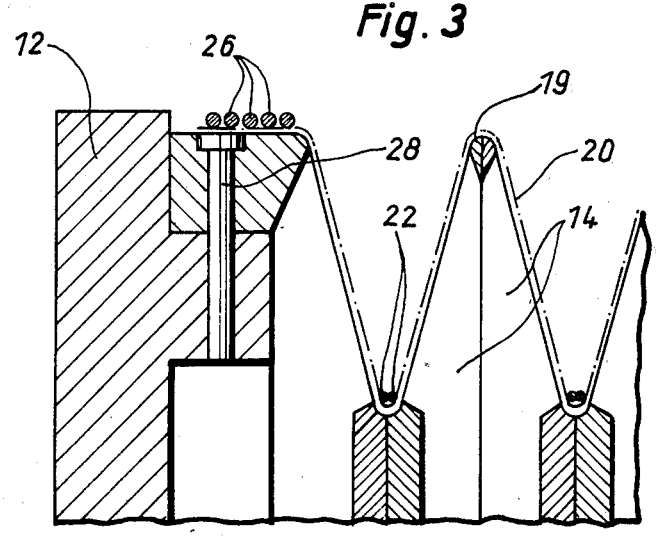
FIG. 3 is the detail B of FIG. 1 to an enlarged scale.

As is particularly evident from FIG. 2, the longitudinal edges 20a and 20b of the filter fabric material overlap as a result of a 360° wrap-around and form a longitudinal seam 20c. Expediently, the overlapping region of this longitudinal seam is sealed off by a suitable cement.

According to the invention, the filter fabric — manufactured of wire of metal or synthetic material — for the filter fabric envelope 20 is diagonally cut; what is to be understood by this, is evident from FIG. 9, in which the axis of the strainer drum is shown dot-dashed at 30. The warp and weft wires, which were designated by 32 in FIG. 9, pass obliquely and preferably at 45° to the cut edges of the filter fabric and to the axis of the drum, which has as a consequence a capability of adaptation of the filter fabric envelope in radial direction. To attain a snug fitting of the filter fabric envelope against the supporting body of the strainer drum, the filter fabric web shown in FIG. 9 is prefolded in zig-zag shape along the foldlines 34, so that the filter fabric assumes the structure shown in FIG. 10. The spacing D of the foldlines 34 from one another corresponds to the spacing of the crests 18 of the supporting body from the base of the grooves 24. The filter fabric web is laid around the supporting body and the filter fabric envelope is closed only after the prefolding.

The structure of the ring-shaped carrier discs 14 is clearly evident from the FIGS. 5 to 8:

At the circumference, they possess a continuous rim 14a, which is carried by the rib-shaped spokes 14b. These also carry a facing disc 14c, to which the spokes are moled on. The carrier discs also display passages 14d, which are represented in the FIGS. 5 and 6, between rim 14a and facing disc 14c. Finally, the carrier discs still possess cylindrical openings 14e for the tie bolts 16.

The carrier discs 14 are preferably made of pressed parts of synthetic material of the disc series always two carrier discs — adjacent to one another in the supporting body of the strainer drum and lying against one another by their facing discs 14c — are cemented to one another.

What is claimed:

1. A strainer drum having an axis and a circumference, comprising
    a. filter fabric supporting means including a series of apertured, axially juxtapositioned carrier discs defining axially spaced, alternating, circumferentially extending crests and roots;
    b. a one-piece prefolded filter fabric positioned substantially 360° about said discs to be supported thereby, said filter fabric having circumferential folds, said filter fabric conforming to said crests and roots and being made of warps and wefts of non stretchable filaments extending obliquely with respect to the strainer to define a filter fabric drum axis, conforming to the shape of discs and overlying the apertures thereof and
    c. securing means for clamping said filter fabric to said discs.

2. A strainer drum as defined in claim 1, wherein the filter fabric has an axial longitudinal seam with overlying longitudinal edges cemented one to the other.

3. A strainer drum as defined in claim 1, wherein the carrier discs have a triangular profile to which said filter fabric conforms.

4. A method of making a strainer drum having an axis and a circumference, and including a series of apertured, axially juxtapositioned carrier discs defining axially spaced, alternating, circumferentially extending crests and roots, comprising the consecutive steps of
    a. prefolding a filter fabric formed of wefts and warps of non stretchable filaments into an accordion shape having alternating, parallel-extending crests and roots spaced from one another identically to the spacing between the crests and roots of the disc series and oriented obliquely with respect to the wefts and warps;
    b. wrapping the prefolded filter fabric onto the disc series substantially 360° about a filter fabric axis that is perpendicular to the crests and roots of the filter fabric for conforming the latter to the outline of the disc series, whereby said filter fabric axis coincides with said strainer drum axis; and
    c. securing the filter fabric to each of the discs to define a strainer drum 5. A method as defined in claim 4, further comprising the step of bonding to one another axially extending longitudinal edge portions of the filter fabric, said edge portions being in an overlapping relationship as a result of step (b).

6. A method as defined in claim 5, further comprising the step of shrinking the filter fabric onto the disc series subsequent to the bonding step and wherein the filaments are of synthetic material.

* * * * *